United States Patent [19]

Chung

[11] 4,056,018

[45] Nov. 1, 1977

[54] MULTIPLE POWER PATH CONCENTRIC SPEED REDUCER

[75] Inventor: Jackson Chung, Mishawaka, Ind.

[73] Assignee: Reliance Electric Company, Mishawaka, Ind.

[21] Appl. No.: 722,026

[22] Filed: Sept. 10, 1976

[51] Int. Cl.$^2$ .................. F16H 37/06; F16H 35/00; F16H 57/00
[52] U.S. Cl. ................................. 74/665 P; 74/391; 74/410
[58] Field of Search .................. 74/391, 410, 665 P

[56] References Cited

U.S. PATENT DOCUMENTS

| | | | |
|---|---|---|---|
| 1,919,924 | 7/1933 | Blakeslee | 74/391 X |
| 2,260,009 | 10/1941 | Doran et al. | 74/410 |
| 2,712,761 | 7/1955 | Chung | 74/410 |
| 2,823,558 | 2/1958 | Semar et al. | 74/665 P |
| 3,452,612 | 7/1969 | Casey | 74/391 |

*Primary Examiner*—Leonard H. Gerin
*Attorney, Agent, or Firm*—Marmaduke A. Hobbs

[57] ABSTRACT

A multiple power path concentric speed reducer in which a center shaft having a pinion thereon and an axle having an externally toothed gear thereon are disposed coaxially with respect to one another, and a plurality of gear trains operatively connect the pinion with the gear to provide multiple power path between the pinion and gear. The power or load is distributed equally between the several gear trains, and the center shaft may be the power input member, a housing the power output member and the axle the reaction member; or the center shaft may be the power input member, the axle the power output member, and the housing the reaction member. The concentric speed reducer is particularly adapted for use in vehicle wheel drives, especially in off-the-highway heavy duty equipment, wherein the speed reducer for each wheel is driven by a separate motor, such as a DC motor, mounted in or on the axle of the respective wheel.

29 Claims, 4 Drawing Figures

MULTIPLE POWER PATH CONCENTRIC SPEED REDUCER

Concentric speed reducers have a wide application in a variety of fields and have had special application in the field of wheel drives for vehicles, particularly as drives for large, off-the-highway vehicles used in mining, highway construction and similar heavy duty equipment. The concentric speed reducers used in wheel drives in most heavy duty equipment have utilized epicyclic gearing and have usually been driven by DC electric motors mounted in the wheel hub or on the vehicle frame adajcent the wheel, thus eliminating expensive, intricate and trouble-prone drive trains connecting the primary source of power, usually a diesel engine, to the drive wheels. In the epicyclic or planetary gear type unit, the input shaft is driven by an electric motor, or in some installations by a hydraulic motor, the stationary axle or spindle forms the reaction component, and the gear reducer housing forms the output component with the rim of the wheel normally being mounted on the housing for rotation therewith. While this drive system has a number of advantages over the conventional direct drive train between the primary motor and the wheels in heavy duty equipment, the planetary gear type drives have certain inherent disadvantages which render them unsatisfactory in some applications, particularly in the larger heavy duty off-the-highway vehicles. For example, in the drives for the larger equipment, the ring gear which is secured to the inner side of the rotatable housing and which encompasses the planetary and sun gears, is one of the largest elements and one of the most difficult to machine and assemble, and, in order to accommodate and operatively support the ring gear and related components, the speed reducer units must be of large and heavy construction. Further, the planetary gear type drives cannot be changed from one gear ratio to another without virtually engineering the gears for each individual unit, thus limiting the versatility of the units and increasing the overall cost to the manufacturer in supplying the range of drives to the trade. Although attempts have been made to reduce the size and weight of the units for any given capacity by integrating structural parts, such as the motor and axle housing, these efforts have created new problems, such as for example, difficulty in manufacturing and installing the units and in servicing and repairing the units in the field. It is therefore one of the principal objects of the present invention to provide a concentric speed reducer which has high torque output through a multiple series of gears of relatively small size and of easy machineability on standard gear cutting machines, and which is compact in construction and simple in operation.

Another object of the invention is to provide a gear speed reducer in which the reducing gear assembly is so constructed and arranged with respect to the center axis of the assembly as to permit essentially vibration-free rotation during operation of the reducer, and which may be encased within and operatively connected to a housing balanced with respect to the center axis and adapted to rotate with the gear assembly to drive a vehicle wheel, conveyor pulley and similar equipment operating components.

Still another object of the invention is to provide a concentric speed reducer of the aforementioned type in which the gear ratio can be readily changed to obtain optimum operating performance in any particular installation, and which is so constructed and designed that the various operating components can be easily replaced, if necessary, and the unit fully and conveniently serviced in the field.

While my concentric speed reducer has special application for vehicle wheel drives, particularly for the large heavy duty off-the-highway equipment, because of its high torque output for its size, it can effectively be used as a stationary speed reducer in which the housing is stationary and a shaft constitutes the power output element for driving a variety of different kinds of equipment, through any one of a number of well known power transmission means, including direct drive couplings, pulleys and belts, and sprockets and chains. In the units for these applications, the gear assembly does not rotate and the housing is secured to a suitable support base or mounted on the equipment driven thereby. It is therefore still another object of the present invention to provide a versatile, compact and relatively simple speed reducer having load sharing multiple gear trains, which automatically distributes the load equally between the gear trains for optimum performance under all normal operating conditions, and which utilizes readily interchangeable, externally toothed gearing for effective adaptation to various operating conditions and to efficient manufacturing and servicing procedures.

Additional objects and advantages of the present invention will become apparent from the following description and accompanying drawings, wherein.

Figure 1:
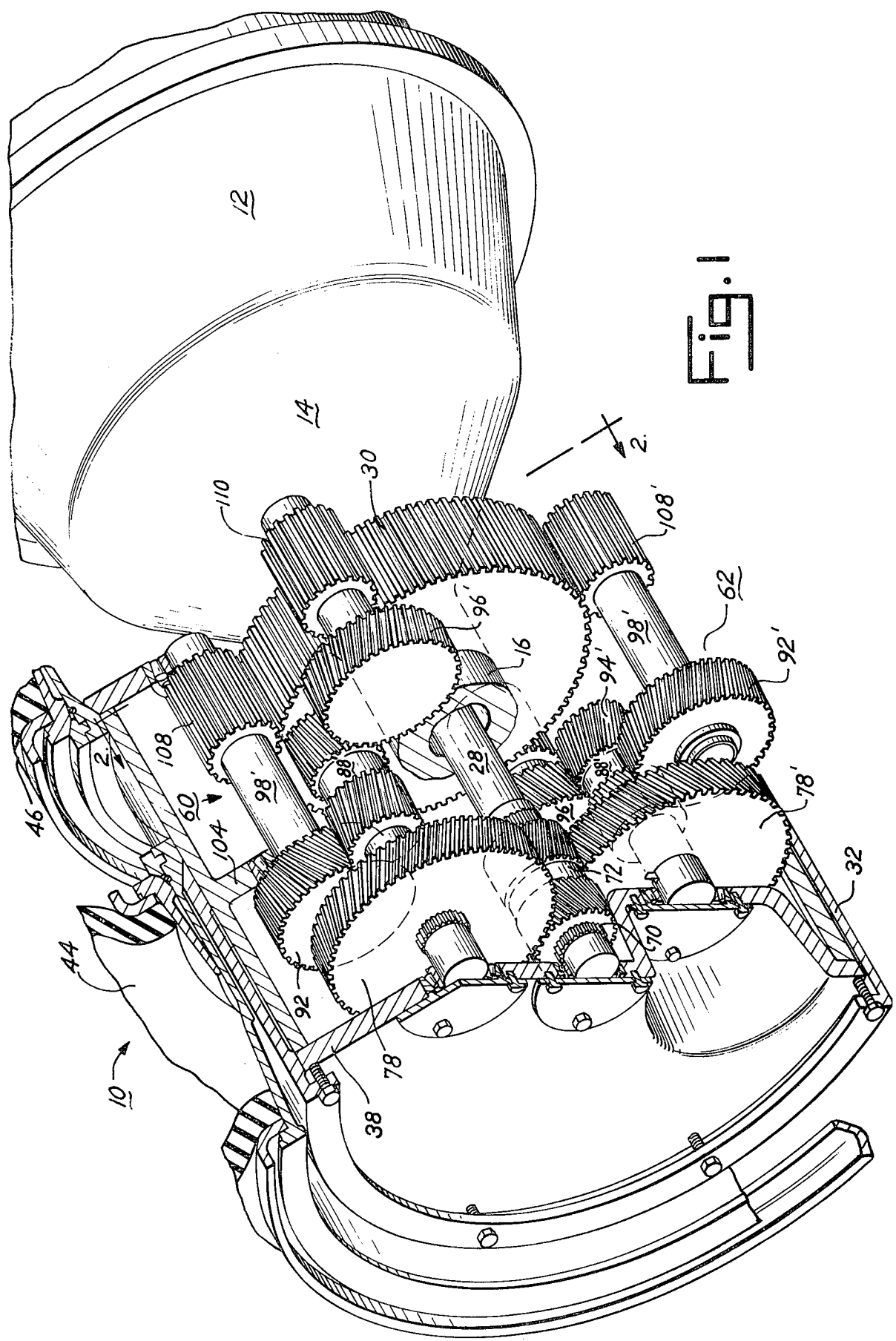
FIG. 1 is a perspective, partial cross sectional view of a multiple power path, concentric speed reducer embodying the present invention.
Figure 2:
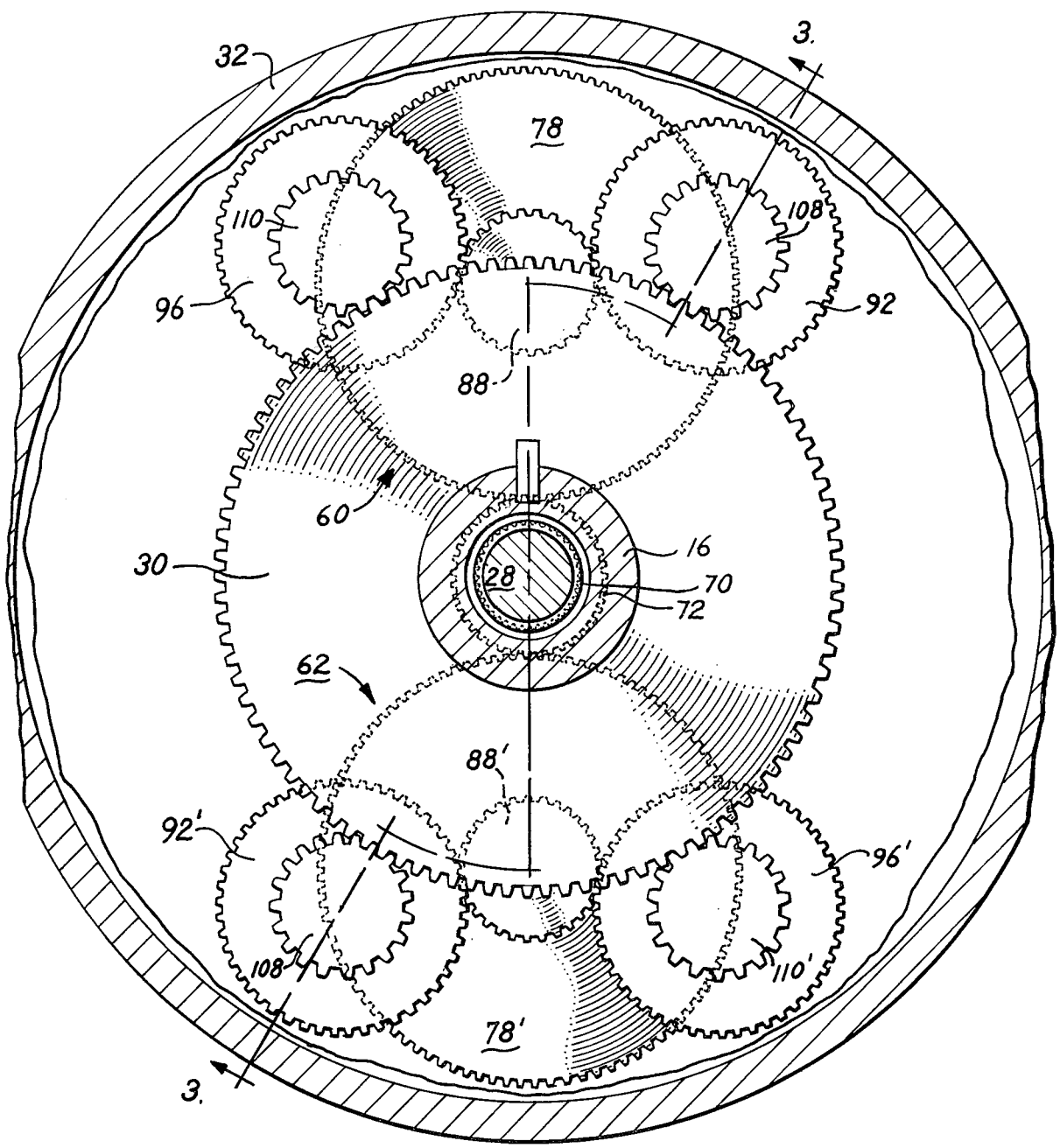
FIG. 2 is a transverse cross sectional view of the speed reducer shown in FIG. 1, the section being taken on line 2 — 2 of the latter figure.

Referring more specifically to the drawings, numeral 10 designates generally the present multiple power path, concentric speed reducer, 12 indicates an axle having a generally cone shaped body 14 and a dead shaft 16 connected integrally thereto and extending axially outwardly therefrom. The body 14 has a motor compartment 18 and an external flange 20, the flange having a plurality of equally spaced holes for receiving bolts or screws for mounting the axle on the frame of a vehicle, such as for example, an off-the-highway truck.

Figure 3:
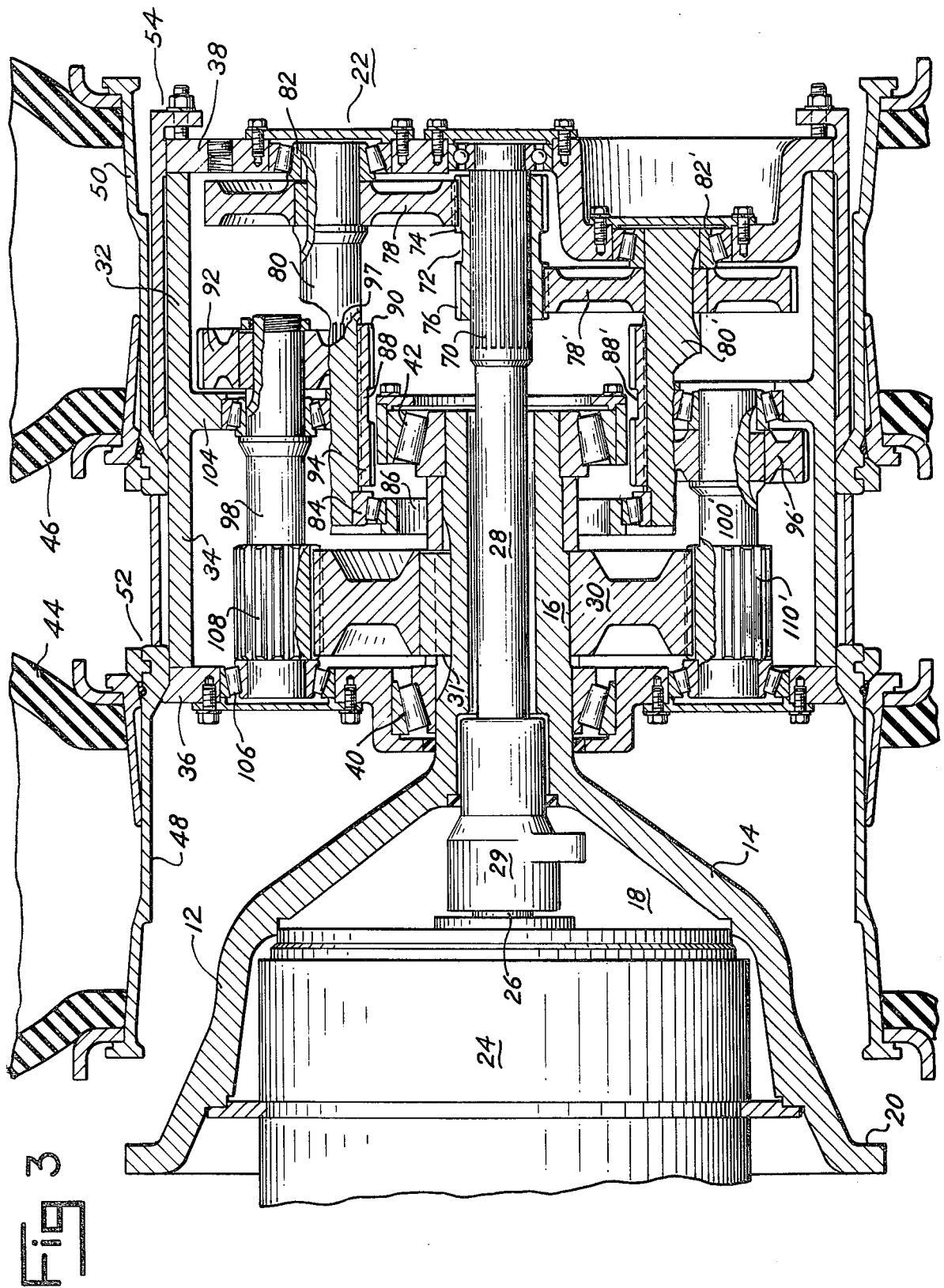
FIG. 3 is a longitudinal cross sectional view of the speed reducer shown in the preceding figures, the section being taken on line 3 — 3 of FIG. 2.

A speed reducer indicated generally by numeral 22 is mounted on and supported by shaft 16 and is driven by a motor 24 disposed in compartment 18 and having an output shaft 26 for connection with input shaft 28 of the speed reducer by a coupling 29. While the drawings show a combination motor and speed reducer for driving a wheel of a vehicle, the mechanism embodying the present invention has many applications in other fields. However, since it is particularly adapted for vehicle drives, the description hereinafter will primarily be directed to the use of the gear reducer and related parts in a vehicle wheel drive. In the embodiment of the invention illustrated in the drawings, the input member is motor driven shaft 28, the reaction member is a gear 30 rigidly mounted on stationary or dead axle 16 by key and keyways indicated generally by numeral 31, and the output member is the housing 32 which fully encloses the gearing of the speed reducer and rotates freely with the gear trains around axle 16 and gear 30, the housing which includes rim 34 and side walls 36 and 38 being supported on axle 16 by roller bearings 40 and 42. As seen in FIGS. 1 and 3, the speed reducer forms the hub of the wheel, and dual tires 44 and 46 are mounted on rims 48 and 50, respectively, which are rigidly connected to the periphery of the housing by suitable securing means indicated generally by numerals 52 and 54; however, any other suitable type of tire and rim securing means may be used.

The gearing which makes possible the high torque output in a compact unit of my concentric speed reducer includes two principal gear trains indicated generally by numerals 60 and 62, both gear trains being driven by the motor through spline shaft 28. The two gear trains 60 and 62 which divide the load from shaft 28 to reaction gear 30 equally in two separate paths, are positioned diametrically opposite from one another relative to shaft 28, and rotate with the housing as the housing is rotatively driven by the gearing of the reducer. The two load sharing gear trains 60 and 62 are essentially the same in construction and operation, and hence only one will be described in detail herein, with like parts of the other being identified by the same numerals with primes.

Figure 4:
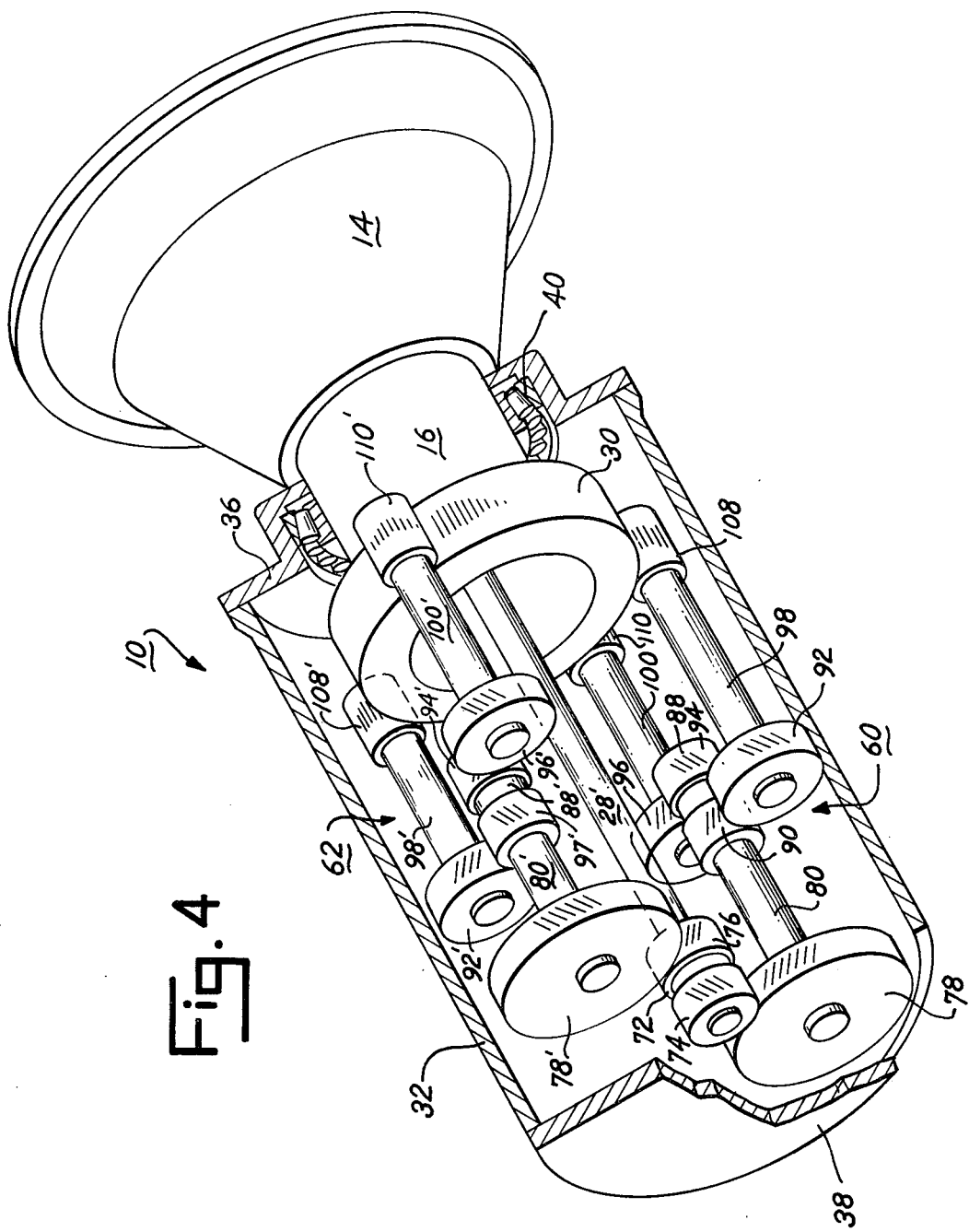
FIG. 4 is a schematic view of the speed reducer shown in the preceding figures, the housing being cut away to clearly show the relationship of the multiple gear trains to one another.

Mounted on the spline section 70 of shaft 28 is a floating, dual pinion 72 having helical gears 74 and 76 thereon. Gear 74 meshes with large gear 78 mounted on a shaft 80, which in turn is journalled in bearings 82 in housing end wall 38 and in bearing 84 mounted on a ring supported by ring 86. Gear 76 meshes with large gear 78' and the teeth on the gears of the pinion and the large gears are of opposite angle in order to equalize the forces transmitted from the pinion to the gear trains 60 and 62. The pinion slides axially in either direction on the spline section to equalize the forces transmitted by the two sets of gear teeth 74 and 76 of the pinion to the gears 78 and 78'. A floating dual pinion 88 mounted on shaft 80 has gear 90 for meshing with large gear 92 and gear 94 for meshing with large gear 96. Pinion 88 is of the same construction as pinion 72 and is mounted on spline section 97 for movement axially on shaft 80 to equalize the forces transmitted through the pinion to the respective large gears. Gears 92 and 96 are mounted on shafts 98 and 100, respectively, and journalled at one end in bearings in housing end 36 and at the other end in housing web 104 shown in FIGS. 1 and 3. Gears 108 and 110 are mounted on shafts 98 and 100 for rotation therewith, and mesh with large reaction gear 30, as best seen in the schematic drawing of FIG. 4.

Since gear 30 is fixedly mounted on stationary axle 16, rotation of shaft 28 transmits the force through pinion 72, gear 78, shaft 80, pinion 88 to drive gears 92 and 96 and gears 108 and 110, thus producing rotation of housing 32 to drive the wheel. As mentioned previously herein, gear train 62 is identical to gear train 60, and hence the forces transmitted from pinion 72 through the respective pinions and gears of gear train 62 to stationary reaction gear 30 apply a torque thereto equal to that applied by gear train 60 to effect rotation of the reducer housing.

In the embodiment of the invention illustrated in the drawings, the driving force from the motor 24 is transmitted through shaft 28 to pinion 72 where the forces are divided equally between gear trains 60 and 62, thus distributing the forces around the periphery of the reaction gear 30 and permitting the unit to handle a substantially greater driving force than it could otherwise handle, without substantially increasing the size of the reducer unit. One of the particular advantages of the present unit is the use throughout of external gearing, which is more economical to machine than internal gearing such as that normally encountered in the planetary type speed reducer, thus substantially decreasing the cost, while simultaneously providing greater versatility by permitting easy changing of ratio between the gears, such as, for example, between pinion 72 and the respective large gears 78 and 78'.

In the use and operation of the present multiple power path, concentric speed reducer, axle 12 is bolted or otherwise secured to the frame of the vehicle or to a steerable axle, depending on the particular type of drive wheel on which the present unit is installed, and as the DC electric motor 24 is energized, shaft 28 is driven, thereby driving pinion 72 and large gears 78 and 78' of the respective gear trains 60 and 62. As the gear trains are driven, gears 108 and 110 of gear train 60 and 108' and 110' of gear train 62 react against stationary gear 30, causing the housing 32 to rotate and thereby rotating the wheel. Since the DC motor is reversible, the wheel is rotated in either direction for forward and rearward movement of the vehicle.

While the concentric speed reducer described herein is particularly adaptable for wheel drives, especially off-the-highway type of equipment as mentioned before, it can also effectively be used in a number of other fields and applications with either the gear 30 and shaft 16 or housing 32 acting as the reaction member. A number of advantages obtained in the use of the unit in wheel drives are also applicable to drives in which the housing is stationary. In the latter type of installation, the reaction gear 30 and a shaft corresponding to shaft 16 on which the gear is mounted, are rotatable, thus providing a reducer in which the input and output shafts are rotatable and the housing is stationary, i.e., the reaction member. The advantages of this type of unit over the planetary type have been mentioned herein, these advantages including more economical machining operations, greater compactness for a given power output, and easier serviceability and interchangeability of the gearing to obtain various gear ratios for optimum performance in any particular installation.

Two gear trains in which the driving force is divided equally in two paths have been described herein; however, additional gear trains, such as three or four, may be used for transmitting the driving forces from shaft 28 in three or four separate paths instead of two, thus further increasing the capacity of the gear reducing unit without a corresponding increase in the size of the unit. The gear trains in the units having the greater number of trains are essentially of the same construction and operation as the two gear trains 60 and 62 described herein, and are spaced equally from the center axis of the unit and equally around the axis to provide a balanced and concentric reducer having operational characteristics identical to the one described herein. The gear trains provide separate paths for the forces transmitted from the motor through shaft 28 to the reaction or output gear corresponding to gear 30 in the embodiment illustrated herein, and the forces transmitted from the center shaft are distributed equally between the gear trains. Further, the gear trains are not necessarily limited to the number of pinions and intermeshing gears thereof shown and described herein. A greater reduction in speed may be obtained by including in each gear train one or more additional dual pinions and corresponding large gears and respective shafts, and a lesser reduction can be obtained by omitting one pinion and gear set of each gear train. While an electric motor has been shown as the source of power for the drive, the reducer may be driven by a hydraulic motor and under some installations may be driven by an AC electric motor.

While one embodiment and several modifications have been described herein with reference to the multiple path, concentric speed reducer, further embodiments and modifications may be made without departing from the scope of the invention.

I claim:

1. A multiple power path, concentric speed reducer comprising center shaft means, axle means disposed coaxially around said shaft means, a first pinion having two sets of gear teeth thereon mounted on said shaft means for rotation therewith, an externally toothed gear mounted on said axle means, and two gear trains operatively interconnecting said pinion with said gear mounted on said axle means for distributing the load transmitted between said shaft means and said axle means and producing relative rotation between said shaft means and axle means, each gear train having a first gear engaging one of the sets of gear teeth on said pinion, a shaft for said first gear, a second pinion mounted on the shaft for said first gear and having two sets of gear teeth thereon, a pair of second gears engaging the two sets of teeth on said second pinion, shafts for said pair of gears, and gears on the shafts for said pair of gears meshing with said externally toothed gear on said axle means.

2. A multiple power path, concentric speed reducer as defined in claim 1 in which said first and second pinions are movable axially and the two gear sets of said pinions contain helical teeth of opposite angle for equalizing the load between the first gear of each gear train.

3. A multiple power path, concentric speed reducer as defined in claim 1 in which said gear trains are disposed diametrically opposite to one another with respect to said center shaft means.

4. A multiple power path, concentric speed reducer as defined in claim 3 in which housing means is provided having two end walls and an outer rim concentric with said center shaft means and said shafts are journalled in said housing means.

5. A multiple power path, concentric speed reducer as defined in claim 4 in which said axle means has an enlarged external end with a compartment therein for receiving a motor for driving said center shaft means, and said housing is rotatably mounted on said axle means.

6. A multiple power path, concentric speed reducer for a wheel drive, comprising rotatable shaft means, a motor for driving said shaft means, stationary axle means disposed coaxially around said shaft means, housing means concentric with said center shaft means, a first pinion having two sets of gear teeth thereon mounted on said shaft means for rotation therewith, an externally toothed reaction gear fixedly mounted on said axle means, and two gear trains operatively interconnecting said pinion with said gear mounted on said axle means for distributing the load transmitted between said shaft means and said axle means and rotating said housing means, each gear train having a first gear engaging one of the sets of gear teeth on said pinion, a shaft for said first gear journalled in said housing means, a second pinion mounted on the shaft for said gear and having two sets of gear teeth thereon, a pair of second gears engaging the two sets of teeth thereon, a pair of second gears engaging the two sets of teeth on said second pinion, shafts for said pair of gears, and gears on the shafts for said pair of gears meshing with said externally toothed reaction gear.

7. A multiple power path, concentric speed reducer as defined in claim 6 in which said first and second pinions are moveable axially and the two gear sets of said pinions contain helical teeth of opposite angle for equalizing the load between the first gear of each gear train.

8. A multiple power path, concentric speed reducer as defined in claim 7 in which the housing means contains an outer rim concentric with said center shaft means, and means is included for securing a wheel to said rim.

9. A multiple power path, concentric speed reducer as defined in claim 8 in which the housing means contains two end walls secured to said outer rim, and said axle means contains a compartment for said motor.

10. A multiple power path, concentric speed reducer as defined in claim 7 in which said axle means has an enlarged external end for receiving said motor for driving said center shaft means, and said housing means is rotatably mounted on said axle means.

11. A multiple power path, concentric speed reducer for a wheel drive, comprising rotatable shaft means, a motor for driving said shaft means, stationary axle means disposed coaxially around said shaft means, housing means concentric with said shaft means, a pinion driven by said shaft means, an externally toothed gear fixedly mounted on said axle means, and a plurality of load sharing gear trains operatively interconnecting said shaft means with said axle means, each gear train having a gear driven by said pinion, a shaft for said pinion driven gear, and a gear on the shaft of said pinion driven gear meshing with said externally toothed gear for rotating said housing means.

12. A multiple power path, concentric speed reducer as defined in claim 11 in which said pinion is moveable axially and has two gear sets thereon containing helical teeth of opposite angle for equalizing the load between the gears of each gear train.

13. A multiple power path, concentric speed reducer as defined in claim 11 in which said gear trains are equally spaced from one another around said center shaft means.

14. A multiple power path, concentric speed reducer as defined in claim 13 in which the housing means includes two end walls journalled on said axle means and an outer rim concentric with said shaft means.

15. A multiple power path, concentric speed reducer as defined in claim 13 in which said axle means has an enlarged external end for supporting said motor and said housing means is rotatably mounted on said axle means.

16. A multiple power path, concentric speed reducer comprising a center shaft means, an axle means disposed coaxially around said shaft means, a first pinion connected to said shaft means for rotation therewith, an externally toothed gear mounted on said axle means, and a plurality of gear trains operatively interconnecting said pinion with said gear mounted on said axle means for distributing the load transmitted between said shaft means and said axle means, producing relative rotation between said shaft means and axle means, each gear train having a first gear engaging said pinion, a shaft for said first gear, a second pinion mounted on the shaft for said first gear and having two sets of gear teeth thereon, a pair of second gears engaging the sets of teeth on said second pinion, shafts for said pair of gears, and gears on the shafts for said pair of gears meshing with said externally toothed gear on said axle means.

17. A multiple power path, concentric speed reducer as defined in claim 16 in which said second pinion is moveable axially and the two sets of teeth on said pinion are helical teeth of opposite angle for equalizing the load between the gears of each gear train.

18. A multiple power path, concentric speed reducer as defined in claim 16 in which said gear trains are equally spaced from one another around said center shaft means.

19. A multiple power path, concentric speed reducer as defined in claim 18 in which housing means is provided having an outer rim concentric with said center shaft means and two end walls journalled on said axle means.

20. A multiple power path, concentric speed reducer comprising rotatable shaft means, axle means disposed coaxially around said shaft means, a pinion driven by said shaft means, an externally toothed gear mounted on said axle means, and a plurality of load sharing gear trains operatively interconnecting said shaft means with said gear mounted on said axle means for producing relative rotation between said shaft means and axle means, each gear train having a gear engaging said pinion, a shaft for said pinion driven gear, and a gear on the shaft of said pinion driven gear meshing with said externally toothed gear on said axle means.

21. A multiple power path, concentric speed reducer as defined in claim 20 in which said pinion is moveable axially and has two gear sets thereon containing helical teeth of opposite angle for equalizing the load between the gears of each gear train.

22. A multiple power path, concentric speed reducer as defined in claim 20 in which said gear trains are equally spaced from one another around said center shaft means.

23. A multiple power path, concentric speed reducer as defined in claim 22 in which housing means is provided having an outer rim concentric with said shaft means and a rim support means journalled on said axle means.

24. A multiple power path, concentric speed reducer comprising rotatable shaft means, an axle means disposed coaxially around said shaft means, a first pinion having two sets of gear teeth thereon mounted on said shaft means for rotation therewith, an externally toothed gear mounted on said axle means, a plurality of load sharing gear trains operatively interconnecting said pinion with said gear mounted on said axle means and being in equally spaced relationship around said shaft means, each gear train having a first gear engaging one of the sets of gear teeth on said pinion, a shaft for said first gear, and a gear driven by the shaft of said first gear meshing with said externally toothed gear on said axle means for distributing the load transmitted between said shaft means and said axle means and producing relative rotation between said shaft means and axle means.

25. A multiple power path, concentric speed reducer as defined in claim 24 in which said pinion is moveable axially and the two gear sets of said pinion contain helical teeth of opposite angle for equalizing the load between the first gear of each gear train.

26. A multiple power path, concentric speed reducer as defined in claim 24 in which the housing means contains an outer rim concentric with said center shaft means.

27. A multiple power path, concentric speed reducer as defined in claim 24 in which housing means is provided having an outer rim concentric with said shaft means and a rim support means journalled on said axle means.

28. A multiple power path, concentric speed reducer comprising rotatable shaft means, axle means disposed coaxially around said shaft means, an externally toothed gear mounted on one of said means, and a plurality of load sharing gear trains operatively interconnecting the other of said means with said externally toothed gear and being in equally spaced relationship around said center shaft means for producing relative rotation between said shaft means and axle means.

29. A multiple power path, concentric speed reducer as defined in claim 24 in which a housing means encloses said gear and said gear trains and is concentric with said shaft means.

* * * * *

UNITED STATES PATENT OFFICE
CERTIFICATE OF CORRECTION

PATENT NO. : 4,056,018
DATED : November 1, 1977
INVENTOR(S) : Jackson Chung

It is certified that error appears in the above-identified patent and that said Letters Patent are hereby corrected as shown below:

In Claim 6: Column 6, line 5, delete "thereon, a pair of"
Column 6, line 6, delete "second gears engaging the two sets of teeth"

In Claim 16: Column 6, line 62, delete "an" and substitute therefor --- a ---
Column 6, line 63, delete "externally toothed"
Column 7, line 7, delete "externally toothed"

In Claim 26: Column 8, line 26, delete "the" and after "means" insert --- supports said gear trains and ---
Column 8, line 27, delete "center"

Signed and Sealed this

Fourteenth Day of February 1978

[SEAL]

Attest:

RUTH C. MASON
Attesting Officer

LUTRELLE F. PARKER
Acting Commissioner of Patents and Trademarks